United States Patent [19]
Ushiro

[11] Patent Number: 5,604,911
[45] Date of Patent: Feb. 18, 1997

[54] METHOD OF AND APPARATUS FOR PRECONDITIONING OF A COEFFICIENT MATRIX OF SIMULTANEOUS LINEAR EQUATIONS

[75] Inventor: Yasunori Ushiro, Yokosuka, Japan

[73] Assignee: Hitachi, Ltd., Tokyo, Japan

[21] Appl. No.: 947,801

[22] Filed: Sep. 21, 1992

[30] Foreign Application Priority Data

Sep. 19, 1991 [JP] Japan .................................. 3-239260

[51] Int. Cl.$^6$ .............................................. G06F 15/347
[52] U.S. Cl. .......................................... 395/800; 364/578
[58] Field of Search ............................ 395/800; 364/578

[56] References Cited

U.S. PATENT DOCUMENTS

| | | | |
|---|---|---|---|
| 4,697,247 | 9/1987 | Grinberg et al. | 364/713 |
| 4,787,057 | 11/1988 | Hammond | 364/754 |
| 5,301,342 | 4/1994 | Scott | 395/800 |

OTHER PUBLICATIONS

Chen et al., "Parallel LU Factorization for Circuit Simulation on a MIMD Computer," International Conference on Computer Design, pp. 129–132. May 1988.
Bratkovic, "Improved Numerical Stability of Sparse Matrix Reduction Method," IEEE International Symposium on Circuits and Systems, pp. 631–634. Aug. 1988.
Gustafsson, "A Class of First Order Factorization Methods," BIT 18 (1978), pp. 142–156.
Van Der Vorst, "ICCG and Related Methods for 3D Problems on Vector Computers," Comp. Phys. Communications, 53 (1989), pp. 223–235.
Van Der Vorst, "B1–CGSTAB: A First and Smoothly Converging Variant of BI–CG for the Solution of Nonsymmetric Linear Systems," pp. 1–16 – Could Not Be Considered Due to Lack of Publishing Date.
Ma et al., "2 Iterative Methods . . . 3 Vectorization and Parallelization," vol. 4, Winter 1990, pp. 12–24.

Primary Examiner—Alyssa H. Bowler
Assistant Examiner—John Harrity
Attorney, Agent, or Firm—Antonelli, Terry, Stout & Kraus, LLP

[57] ABSTRACT

To analyze a physical phenomenon by a computer having a plurality of vector processors and a parallel computer, there is generated submatrices in a preconditioning for obtaining solutions of simultaneous linear equations. Nonzero elements of the coefficient matrix are stored with column number indices assigned thereto such that the elements of the coefficient matrix and the data of right-side vector are scaled according to a sum of absolute values of nondiagonal elements of the coefficient matrix and a diagonal element related thereto. The nonzero elements are sorted depending on magnitude of their absolute values to subdivide the nondiagonal nonzero elements into m submatrices E1, E2, . . . , Em each having substantially a comparable order. Using products developed between differences between a unit matrix and these submatrices in the iterative calculations for a large-sized numerical simulation, there is obtained quite a satisfactory characteristic of convergence of solutions and hence the processing speed is remarkably increased.

15 Claims, 14 Drawing Sheets

FIG. 1

FOR LINEAR EQUATIONS $Ax = b$, ASSUME $D(N)$ TO BE DIAGONAL MATRIX, $B(N)$ TO BE RIGHT-SIDE VECTOR, AND $\tilde{A}(N, ND)$ TO BE NONDIAGONAL NONZERO ELEMENT MATRIX, AND DEFINE COLUMN NO. TABLE $L(N, ND)$ FOR $\tilde{A}$ AND STORE IT IN STORAGE, WHERE N IS AN ORDER OF MATRIX AND ND IS THE MAXIMUM NUMBER OF NONZERO ELEMENTS PER ROW EXCEPTING DIAGONAL ELEMENT ~1

$$u_i \leftarrow \sum_{j=1}^{ND} |\tilde{A}(i,j)| \quad (i=1,\cdots,N)$$

$$w_i \leftarrow \frac{1+\alpha}{MAX(D(i), u_i) + \alpha \times D(i)} \quad (i=1,\cdots,N)$$

~2

$D(i) \leftarrow D(i) \times w_i$, $B(i) \leftarrow B(i) \times w_i$
$\tilde{A}(i,j) \leftarrow \tilde{A}(i,j) \times w_i \quad (i=1,\cdots,N, j=1,\cdots,ND)$ ~3

SORT ITEMS BY j ACCORDING TO
$|\tilde{A}(i,j)| \geq |\tilde{A}(i,j+1)| \quad (i=1,\cdots,N, j=1,\cdots,ND-1)$ ~4
ASSOCIATIVELY, $L(i,j)$ IS CHANGED SUBDIVIDE $\tilde{A}$ OF MATRIX SUCH THAT $E_1, E_2, \cdots E_m$ HAVE SUBSTANTIALLY IDENTICAL NORM. GENERATE SUBMATRICES AS $E_1 \equiv \tilde{A}(N,1)$, $E_2 \equiv \tilde{A}(N,2) \cdots E_m \equiv \tilde{A}(N,\ell) + \cdots + \tilde{A}(N,ND)$ ~5

F I G. 2

SUBDIVISION OF NONDIAGONAL NONZERO MATRIX $\tilde{A}(N,ND)$ (1) FOR $ND \geq 51$, SUBDIVIDE $\tilde{A}$ AS FOLLOWS $E_1 \equiv \tilde{A}(N,1)$, $E_2 \equiv \tilde{A}(N,2)$, $E_3 \equiv \tilde{A}(N,3)$, $E_4 \equiv \tilde{A}(N,4)$ $E_5 \equiv \tilde{A}(N,5) + \tilde{A}(N,6)$, $E_6 \equiv \tilde{A}(N,7) + \tilde{A}(N,8)$ $E_7 \equiv \tilde{A}(N,9) + \tilde{A}(N,10) + \tilde{A}(N,11)$ $E_8 \equiv \tilde{A}(N,12) + \tilde{A}(N,13) + \tilde{A}(N,14)$ $E_9 \equiv \tilde{A}(N,15) + \tilde{A}(N,16) + \tilde{A}(N,17) + \tilde{A}(N,18)$ $E_{10} \equiv \tilde{A}(N,19) + \tilde{A}(N,20) + \tilde{A}(N,21) + \tilde{A}(N,22)$ $E_{11} \equiv \tilde{A}(N,23) + \cdots + \tilde{A}(N,28)$ $E_{12} \equiv \tilde{A}(N,29) + \cdots + \tilde{A}(N,34)$ $E_{13} \equiv \tilde{A}(N,35) + \cdots + \tilde{A}(N,42)$ $E_{14} \equiv \tilde{A}(N,43) + \cdots + \tilde{A}(N,50)$ $E_{15} \equiv \tilde{A}(N,51) + \cdots + \tilde{A}(N,ND)$

~7

(2) FOR $ND \leq 50$, USE ABOVE METHOD UP TO INTERMEDIATE POINT. FOR EXAMPLE, FOR $ND=27$, SUBDIVIDE $\tilde{A}$ AS FOLLOWS.

USE ABOVE METHOD FOR $E_1$ TO $E_{10}$ AND $E_{11} \equiv \tilde{A}(N,23) + \cdots + \tilde{A}(N,27)$

$$r = (I-E_m)\cdots(I-E_2)(I-E_1)\cdot p_0 = (I-E_m)\cdots(I-E_2)(I-E_1)(b-A\cdot x)$$
$$p = r_0 = r, \quad C_1 = (r,r)$$

— 10

REPEAT CALCULATIONS UNTIL CONVERGED SOLUTION IS OBTAINED — 11

12 —

$$q = (I-E_m)\cdots(I-E_2)(I-E_1)\cdot p_0$$
$$= (I-E_m)\cdots(I-E_2)(I-E_1)\cdot A\cdot p, \quad \sigma = (r_0\cdot q)$$

$$\alpha = C_1/\sigma$$

$$e = r - \alpha\cdot q, \quad w = (I-E_m)\cdots(I-E_2)(I-E_1)\cdot p_0$$
$$= (I-E_m)\cdots(I-E_2)(I-E_1)\cdot A\cdot e$$

$$\mu = (e,w)/(w,w)$$

$$x = x + \alpha\cdot p + \mu\cdot e$$

$$r = e - \mu\cdot w$$

$$C_2 = (r_0, r), \quad \beta = C_2/(\mu\cdot\sigma)$$

$$C_1 = C_2$$

$$p = r + \beta\cdot(p - \mu\cdot q)$$

| COLUMN NO. | 22 | | 20 | | | | |
|---|---|---|---|---|---|---|---|
| 1 | 2 | 8 | 9 | | | | |
| 2 | 1 | 3 | 8 | 9 | 10 | | |
| 3 | 2 | 4 | 9 | 10 | 11 | | |
| 4 | 3 | 5 | 10 | 11 | 12 | | |
| 5 | 4 | 6 | 11 | 12 | 13 | | |
| 6 | 5 | 7 | 12 | 13 | 14 | | |
| 7 | 6 | 10 | 14 | | | | |
| 8 | 1 | 2 | 9 | 15 | 16 | | |
| 9 | 1 | 2 | 3 | 8 | 10 | 15 | 16 | 17 |
| 10 | 2 | 3 | 4 | 9 | 11 | 16 | 17 |
| 11 | 3 | 4 | 5 | 10 | 12 | | |
| 12 | 4 | 5 | 6 | 11 | 13 | 18 | 19 |
| 13 | 5 | 6 | 7 | 12 | 14 | 18 | 19 | 20 |
| 14 | 13 | 19 | 20 | | | | |
| 15 | 8 | 9 | 16 | 21 | 22 | | |
| 16 | 8 | 9 | 10 | 15 | 17 | 21 | 22 | 23 |
| 17 | 9 | 10 | 16 | 22 | 23 | 24 | |
| 18 | 12 | 13 | 19 | 25 | 26 | | |
| 19 | 12 | 13 | 14 | 18 | 20 | 25 | 26 | 27 |
| 20 | 19 | 26 | 27 | | | | |
| 21 | 15 | 16 | 22 | | | | |
| 22 | 15 | 16 | 17 | 21 | 23 | | |
| 23 | 16 | 17 | 22 | 24 | 28 | 29 | |
| 24 | 17 | 23 | 25 | 28 | 29 | 30 | |
| 25 | 18 | 19 | 24 | 26 | 29 | 30 | 31 |
| 26 | 18 | 19 | 20 | 25 | 27 | 30 | 31 | 32 |
| 27 | 26 | 31 | 32 | | | | |
| 28 | 23 | 24 | 29 | 33 | | | |
| 29 | 23 | 24 | 25 | 28 | 30 | 33 | 34 |
| 30 | 24 | 25 | 26 | 29 | 31 | 33 | 34 | 35 |
| 31 | 25 | 26 | 27 | 30 | 32 | 34 | 35 | 36 |
| 32 | 26 | 27 | 31 | 35 | 36 | | |
| 33 | 28 | 29 | 30 | 34 | | | |
| 34 | 29 | 30 | 31 | 33 | 35 | | |
| 35 | 30 | 31 | 32 | 34 | 36 | | |
| 36 | 31 | 32 | 35 | | | | |

L(N,ND): COLUMN NO. TABLE $\widetilde{A}$(N,ND): NONDIAGONAL NONZERO MATRIX

FIG. 7

ASSUME D(N) TO BE DIAGONAL MATRIX, B(N) TO BE RIGHT SIDE VECTOR, AND $\widetilde{A}$(N,6) TO BE NONDIAGONAL NONZERO BAND MATRIX (3-DIMENSIONAL 7-POINT DIFFERENCE CALCULUS), THERE N IS AN ORDER OF MATRIX ~31

$u_i \leftarrow |A(i,1)| + |A(i,2)| + \cdots + |A(i,6)|$ $w_i \leftarrow \dfrac{1+\alpha}{\mathrm{MAX}(D(i), u_i) + \alpha \times D(i)}$  $(i=1,\cdots N)$ ~32

$D(i) \leftarrow D(i) \times w_i$, $B(i) \leftarrow B(i) \times w_i$ $\widetilde{A}(i,j) \leftarrow \widetilde{A}(i,j) \times w_i$  $(i=1,\cdots,N, j=1,\cdots,6)$ ~33

$A_1 \equiv \widetilde{A}(N,1)$, $A_2 \equiv \widetilde{A}(N,2)$ $A_3 \equiv \widetilde{A}(N,3)$, $A_4 \equiv \widetilde{A}(N,4)$ $A_5 \equiv \widetilde{A}(N,5)$, $A_6 \equiv \widetilde{A}(N,6)$ ~34

GENERATE PRODUCT $(I-A_1)\cdot(I-A_2)\cdots(I-A_6)$ ~35

$$w_i = \{MAX(d_i, u_i) + d_i\}/2$$

$$(i=1,2,\cdots,N)$$

~51

$$\tilde{d}_i = 1/\{w_i - a_i \times \tilde{d}_{i-m} \times (g_{i-m} + \alpha \times (e_{i-m} + f_{i-m}))$$

$$-b_i \times \tilde{d}_{i-e} \times (f_{i-e} + \alpha \times (g_{i-e} + e_{i-e}))$$

$$-c_i \times \tilde{d}_{i-1} \times (e_{i-1} + \alpha \times (f_{i-1} + g_{i-1}))\}$$

$$(i=1,\cdots,N)$$

57 — GENERATES INCOMLETE LU FACTORIZATION MATRIX LDU FROM MATRIX A

58:
$r = (LDU)^{-1}(b - Ax)$
$p = r_0 = r$ , $C = (r, r)$

59 — REPEAT CALCULATIONS UNTIL CONVERGED SOLUTION IS OBTAINED

60:
$q = (LDU)^{-1} \cdot w = (LDU)^{-1} \cdot A \cdot p$ $\sigma = (r_0, q)$ , $\alpha = C / \sigma$ $e = r - \alpha \cdot q$ $w = (LDU)^{-1} \cdot A \cdot e$ $\mu = (e, w) / (w, w)$ $x = x + \alpha \cdot p + \mu \cdot e$ $r = e - \mu \cdot w$ $C = (r_0, r)$ , $\beta = C / (\mu \cdot \sigma)$ $p = r + \beta \cdot (p - \mu \cdot q)$

FIG. 14

67 — SET KEY AS SHOWN IN FIG. 13

68
GENERATE ELEMENTS $A_1, A_2, \cdots A_6$ FROM MATRIX $A$ : KEY = 0
- - - - - - - - - - - - - - - - - - - - - - - - -
GENERATE INCOMPLETE LU FACTORIZATION MATRIX LDU FROM MATRIX $A$ : KEY = 1

69
$r = (I-A_1) \cdots (I-A_6)(b-A\cdot x)$ ; KEY = 0
- - - - - - - - - - - - - - - - - - - - - - - - -
$r = (LDU)^{-1}\cdot (b-A\cdot x)$ ; KEY = 1

70
$p = r_0 = r$ , $C = (r,r)$

71 REPEAT CALCULATIONS UNTIL CONVERGED SOLUTION IS OBTAINED

72
$q = (I-A_1)\cdots (I-A_6)\cdot A\cdot p$ ; KEY = 0
$q = (LDU)^{-1}\cdot A\cdot p$ ; KEY = 1

73
$\sigma = (r_0, q)$ , $\alpha = C/\sigma$
$e = r - \alpha \cdot q$

74
$w = (I-A_1)\cdots (I-A_6)\cdot A\cdot e$ ; KEY = 0
$w = (LDU)^{-1}\cdot A\cdot e$ ; KEY = 1

75
$\mu = (e, w)/(w, w)$
$x = x + \alpha \cdot p + \mu \cdot e$
$r = e - \mu \cdot w$
$C = (r_0, r)$ , $\beta = C/(\mu \cdot \sigma)$
$p = r + \beta \cdot (p - \mu \cdot q)$

5,604,911

METHOD OF AND APPARATUS FOR PRECONDITIONING OF A COEFFICIENT MATRIX OF SIMULTANEOUS LINEAR EQUATIONS

CROSS-REFERENCE TO RELEVANT PATENT APPLICATIONS

The present application relates to the U.S. patent application Ser. No. 07/672,409 entitled "Simultaneous Linear Equation Analyzing Device" and filed on Mar. 20, 1991 by Kenji Araki.

BACKGROUND OF THE INVENTION

The present invention relates to an apparatus for computing numerical solutions of simultaneous linear equations, and in particular, to such an apparatus for implementing pre-processing or pre-conditioning of a coefficient matrix of the linear equations as a vector computer conducting a large-sized numerical simulation, a computer accomplishing concurrent or parallel processing, or a workstation.

A structure for conducting a matrix operation and a physical system represented by linear equations have been described in the U.S. Pat. Nos. 4,787,057 and 4,697,247.

A conjugate gradient (CG) method, pre-conditioning by an incomplete LU decomposition or factorization, and a method of solving simultaneous linear equations according to a conjugate gradient method have been described in such articles as I. Gustafsson, "A Class of First Order Factorization Methods", BIT 18 (1978), pp. 142–156; H. A. van der Vorst, "ICCG and Related Methods for 3D Problems on Vector Computers", Comp. Phys. Communications, 53 (1989), pp. 223–235; H. A. van der Vorst, "BI-CGSTAB: A First and Smoothly Converging Variant of BI-CG for the Solution of Nonsymmetric Linear Systems", pp. 1–16; and Sangback Ma, et al., "2 Iterative Methods . . . 3 Vectorization and Parallelization", Vol. 4, Winter 1990, pp. 12–24.

The method of analyzing linear equations in which the incomplete LU factorization is used in the preconditioning of the equations cannot be easily applied to a computer having a plurality of vector processing units or a super-parallel computer achieving an extreme number of parallel computations.

In a triangular factorization of a matrix A, the matrix is decomposed into a lower triangular matrix L and an upper triangular matrix U, thereby expressing the matrix as a product LU (=A). Achieving a discrete approximation according to the finite element method on a quantity or an area representing a phenomenon expressed by partial differential equations, there are attained simultaneous linear equations having a sparse coefficient matrix. Namely, the matrix has a low ratio of non-zero elements to the elements thereof. In contrast thereto, the ratio of nonzero elements in the matrix thus decomposed into the L and U portions is increased. The generation of nonzero elements is ordinarily called "fill-in". In the incomplete LU factorization, the process can be achieved by ignoring the fill-in areas (approximated to zeros). Consequently, the L and U matrices obtained by achieving the incomplete LU decomposition on all nonzero elements of the coefficient matrix respectively have the same structures as the Structures respectively of the lower and upper triangular portions of the matrix A.

According to an advanced method developed to apply the method above to a computer having a plurality of vector processing units, the incomplete LU factorization cannot be easily applied to the plural vector processors. Namely, in an iteration for the number of two-dimensional lattice or grid points in a region subdivided into $m_x$ by $m_y$, the vector length is limited to $m_x$.

According to the method in which the incomplete LU factorization is employed for conjugate gradient (CG) series to conduct iterative computations to solve linear equations, the correction $(1+\delta)$ of the Ivar Gustafsson type is used in the incomplete LU decomposition.

In the incomplete LU decomposition above; the degree of parallelization $n_x \cdot n_y$ in the three-dimensional processing is considerably smaller than the order or dimensionality $n=n_x \cdot n_y \cdot n_z$ of the linear system. Moreover, the degree $n_x$ in the two-dimensional processing is remarkably smaller than the order $n=n_x \cdot n_y$. Heretofore, there have been proposed methods in which without using the incomplete LU factorization, a plurality of matrices are multiplied by each other in the preconditioning. However, according to these methods, the convergence speed of numerical solutions of the linear equations is lowered when compared with the solution adopting the incomplete LU factorization, which leads to a disadvantage that when the property of the coefficient matrix is deteriorated (i.e., when an ill condition exists), the convergence of solutions becomes to be unstable.

Moreover, in a case where the calculation of conjugate gradient series is utilized in the iterative computation for solution of linear equations and the conventional incomplete LU decomposition is employed in the preconditioning step, when a matrix obtained by discretizing the quantity represented by a diffusion convection equation in accordance with the calculus of finite differences has a deteriorated property (e.g., the cell péclet number is large), the conversion speed is lowered. In consequence, with a trifle error in setting the parameters, the conversion of solutions cannot be realized in many cases.

SUMMARY OF THE INVENTION

It is therefore an object of the present invention to provide a method of computing preconditioning matrices of simultaneous linear equations suitably applicable to a computer having a plurality of vector processing units and a parallel computer.

Another object of the present invention is to provide an apparatus for and a method of analyzing a physical phenomenon wherein the degree of parallelization is increased in the preconditioning for solution of simultaneous linear equations.

Still another object of the present invention is to provide a system wherein even if the property of coefficient matrix of linear equations is in an undesirable or ill condition, the convergence of numerical solution thereof is satisfactorily achieved, thereby attaining numerical solutions at a high speed.

Further another object of the present invention is to provide a parallel computer wherein preconditioning matrices are established according to a method other than the incomplete factorization associated with an unsatisfactory low degree of parallelization, thereby increasing the iterative computation speed for the solution of the linear equations.

A first aspect of the present invention is as follows.

First, to establish the calculation method suitable for the parallel processing, the incomplete LU factorization of the matrix A is not achieved in the preconditioning. Namely, the non-diagonal nonzero elements of the matrix A are subdivided into m submatrices E1, E2, ..., Em such that each preconditioning matrix w is formed with multiplications between (I−Ei), i=1, 2, ..., m. Resultantly, in the overall region of the vector operations for the solution of linear equations, there can be obtained a degree of parallelization almost identical to the order n of the matrix A (n= $n_x \cdot n_y \cdot n_z$ for a three-dimensional matrix and n=$n_x \cdot n_y$ for a two-dimensional matrix).

Next, to improve the characteristic of convergence of solution in the calculation of conjugate gradient series and to increase the computation speed, there is employed a computing method in which nondiagonal nonzero elements are assigned with column number indices for each row and are then stored in a storage. These elements are then sorted in a descending order of absolute values thereof so as to produce submatrices E1, E2, E3, ..., Em of the matrix A. In this operation, for the leading elements E1, E2, E3, E4, etc., the subdivision is conducted such that the resultant row includes an element. When the absolute value of the element becomes smaller, the row includes a total of some elements. As a result, it is possible to set the norm $\sigma i=\|Ei\|$ of each of the matrices obtained through the subdivision as (I−Ei), i=1, 2, ..., m to be considerably smaller than one. This consequently improves the characteristic of convergence in solving the conjugate gradient series and increases the processing speed to obtain the numerical solutions of simultaneous linear equations.

Subsequently, also in a case where the coefficient matrix of linear equations thus obtained through the discrete approximation is in an ill condition (diagonal element superiority, i.e., superiority of diagonal elements over nondiagonal element of the coefficient matrix is considerably deteriorated), to stabilize the convergence of numerical solution of conjugate gradient series, there is employed a method, in place of a method in which the matrix A and the right-side vector are ordinarily subjected to scaling based on an diagonal matrix, of conducting the scaling according to diagonal elements and the sum of absolute values of nondiagonal elements. As a result, even when the matrix A is in the undesirable condition, the norm $\sigma i=\|Ei\|$ of each of the matrices obtained through the subdivision as (I−Ei), i=1, 2, ..., m can be set to be smaller than one. This accordingly enables the linear equations to be analyzed in a stable condition.

As a second aspect of the present invention, the following technological means is adopted to process simultaneous linear equations, which are developed through a discrete approximation according to the calculus of finite differences, at a high speed in a stable condition by use of a method of calculating conjugate gradient series. Moreover, there is implemented a preconditioning oriented to the parallel processing.

First, to establish the calculation procedure to be oriented to the parallel processing, the incomplete LU factorization of the matrix A is not used in the preconditioning. Namely, the nondiagonal nonzero matrices of the matrix A are split into bands to form m submatrices A1, A2, ..., Am, which are sequentially arranged beginning from the band at the lower-right element of the coefficient matrix, thereby configuring preconditioning matrices with products resulted from multiplications between (I−Ai), i=1, 2, ..., m. The value of m takes four for a two-dimensional five-point difference calculus and six for three-dimensional seven-point difference calculus. When there exists a periodic boundary condition, the value of m is increased by two or four. With the provision above, for any processing step in the analysis of linear equations, the degree of parallelization can be set to be equal to the dimensionality or order n of the matrix A. In addition, as a result of the subdivision of the nondiagonal matrix into m submatrices, the characteristic of convergence of conjugate gradient series can be improved.

Next, even when the coefficient matrix of linear equations thus obtained through the discrete approximation is in an ill condition (diagonal element superiority of the coefficient matrices is considerably deteriorated), to stabilize the convergence of numerical solution of conjugate gradient series, there is employed a method, in place of a method in which the matrix A and the right-side vector are ordinarily subjected to scaling based on an diagonal matrix, of conducting the scaling according to the diagonal elements and the sum of absolute values of nondiagonal elements. As a result, even when the matrix A is in the ill condition, the norm $\sigma i=\|Ei\|$ of each of the matrices obtained through the subdivision as (I−Ei), i=1, 2, ..., m can be set to be smaller than one. This accordingly enables the linear equations to be analyzed under a stable condition.

According to a third aspect of the present invention, in order to achieve a high-speed stable computation of linear equations, which are attained through a discrete approximation based on the difference calculus, by use of a method of calculating conjugate gradient series with an incomplete LU factorization, it is possible to adopt the following technological means for the incomplete LU factorization.

In the conventional method, the incomplete LU factorization is directly conducted on the coefficient matrix A. As contrast thereto, according to the present invention, the absolute value of each diagonal element is combined with the sum of absolute values of associated nondiagonal elements. Values resultant from the operation achieved above are assumed to be diagonal elements in the incomplete LU factorization. In this method, the correction coefficient $\alpha$ can be set to a fixed value in the Gustafsson-type correction, which is not remarkably influenced from the deterioration of the property of the coefficient matrix thus attained, thereby keeping the stability of the convergence.

Furthermore, in a case where the incomplete LU factorization is adopted in the preconditioning, even when the coefficient matrix is in an ill condition, namely, has an inappropriate property (the sum of absolute values of nondiagonal elements is larger than the absolute value of the associated diagonal element), there are developed an advantage of a satisfactory stability of convergence and a disadvantage of deterioration in the processing efficiency of the plural vector processing units. On the other hand, using the matrix constituted with multiplications between (I−Ai), i=1, 2, ..., m of the second aspect in the preconditioning, there are obtained reversed results of the advantage and disadvantage associated with the incomplete LU factorization. Consequently, as technological means for developing a high-speed stable convergence under any conditions, there is adopted a method in which the number of available vector processors and a ratio between an absolute value of each diagonal element and the sum of absolute values of nondiagonal elements related thereto are employed as parameters to select a favorable one of two preconditioning procedures.

As the preconditioning for the solution of conjugate gradient series, although the processing of the incomplete LU factorization can be established to be suitable for vector processors, it is difficult to set the processing to be oriented to the super-parallel processing. According to the first aspect of the present invention, the preconditioning matrix is configured with products resultant from multiplications between (I−Ei), i=1, 2, ..., m. This leads to a computing method favorably applicable to a computer having a plurality of vector processors and to a super-parallel computer of a certain type. As means for improving the convergence in the solution of conjugate gradient series, there is adopted the technological means in which the nondiagonal nonzero elements are respectively assigned with column number indices for each row and then the resultant items are sorted in a descending order of absolute values thereof, thereby producing submatrices E1, E2, . . . , Em of the matrix A. In this operation, the subdivision is achieved such that the resultant item includes an element for the leading submatrices; whereas, in the subdivision for the trailing submatrices including elements having a small absolute value, a plurality of elements are included in the resultant item. As a result, for the resultant submatrices, the norm $\sigma i=\|Ei\|$, $i=1, 2, \ldots, m$ can be set to be considerably smaller than one, which improves the convergence of solution of conjugate gradient series and increases the processing speed of analysis of simultaneous linear equations. Moreover, as technological means for stabilizing convergence of conjugate gradient series, there is adopted a method of scaling the matrix A and the right-side vector b according to each diagonal element and the sum of absolute values of associated nondiagonal elements. Resultantly, even when the diagonal element superiority of the coefficient matrix A is remarkably deteriorated, it is possible to obtain converged numerical solutions for the linear equations. In addition, the nonzero elements need not be subdivided into lower and upper triangular portions so as to store these portions in a storage. Consequently, the overall storage capacity is reduced as compared with the case in which the incomplete LU factorization is used.

As the preconditioning for solution of conjugate gradient series, although the processing procedure can be established to be suitable for vector processors according to the incomplete LU factorization, it is difficult to set the processing to be appropriate for the super-parallel processing. According to the second aspect of the present invention, the preconditioning matrix is structured with products resulted from multiplications between $(I-Ai)$, $i=1, 2, \ldots, m$, thereby implementing a calculation method favorably applicable to a computer having a plurality of vector processors and a super-parallel computer. Moreover, by configuring the preconditioning matrix with the results from multiplications between $(I-Ai)$, $i=1, 2, \ldots, m$, as compared with the conventional case where a formula $E=A_1+A_2+\ldots+Am$ is adopted to establish a formula $I-E+E^2-E^3+E^4 \ldots$, the convergence of solution can be improved for the gradient series. In addition, as technological means for stabilizing convergence of solution of conjugate gradient series, there is adopted a method of scaling the matrix A and the right-side vector b according to each diagonal element and the sum of absolute values of associated nondiagonal elements. Resultantly, even when the diagonal element superiority of the coefficient matrix A is remarkable deteriorated, it is possible to obtain converged numerical solutions for the linear equations in a stable condition.

In the conventional method in which the incomplete LU factorization is directly conducted on the coefficient matrix A, when the diagonal element superiority is considerably deteriorated, there appears a drawback that the conjugate gradient series with preconditioning does not lead to the convergence of solution. According to the third aspect of the present invention, the values generated by combining the absolute value of each diagonal element with the sum of absolute values of associated nondiagonal elements are assumed to be diagonal elements in the incomplete LU factorization. It is therefore possible to avoid the disadvantageous state in which the diagonal elements after factorization are extremely minimized during the incomplete LU factorization. This leads to an advantageous effect of a stable convergence even when the diagonal element superiority of the coefficient matrix A is remarkably deteriorated. Moreover, there is also attained an advantage that the convergence speed is rarely changed even when the correction coefficient $\alpha$ of the Gustafsson-type correction is fixed to about 0.95. Furthermore, when conducting iterative calculations for solution of linear equations according to conjugate gradient series in a parallel computer having a plurality of vector processors, the method in which the incomplete LU factorization is adopted in the preconditioning and the method in which the matrix structured with products resultant from multiplications between $(I-Ai)$, $i=1, 2, \ldots, m$ are used in the preconditioning are respectively attended with advantageous and disadvantageous features. Such features are strongly influenced from two parameters including the number of available vector processors and the ratio between the absolute value of diagonal element and the sum of absolute values of nondiagonal elements. Consequently, depending on these parameters, either one of the two preconditioning procedures suitable for the given condition is automatically selected to achieve calculations at a higher speed.

BRIEF DESCRIPTION OF THE DRAWINGS

These and other objects and advantages of the present invention will become apparent by reference to the following description and accompanying drawings wherein:

FIG. 1 is a flowchart showing the procedure of generating a preconditioning matrix M for use in the numerical solution of conjugate gradient series in a first embodiment/according to the present invention;

FIG. 2 is a diagram specifically showing a method of dividing the preconditioning matrix M into submatrices;

FIG. 3 is a flowchart showing the procedure for calculating conjugate gradient series with preconditioning;

FIG. 7 is a flowchart showing the procedure for creating a preconditioning matrix M for use in a numerical calculation of conjugate gradient series in an embodiment according to the present invention;

FIG. 10 is a flowchart showing the procedure for creating a preconditioning matrix M for use in a numerical calculation of conjugate gradient series in a third embodiment according to the present invention;

FIG. 12 is a flowchart showing the procedure of calculating conjugate gradient series with preconditioning;

FIG. 14 is a flowchart showing the procedure of computing conjugate gradient series with another preconditioning.

DESCRIPTION OF THE PREFERRED EMBODIMENTS

Embodiment 1

Figure 4:
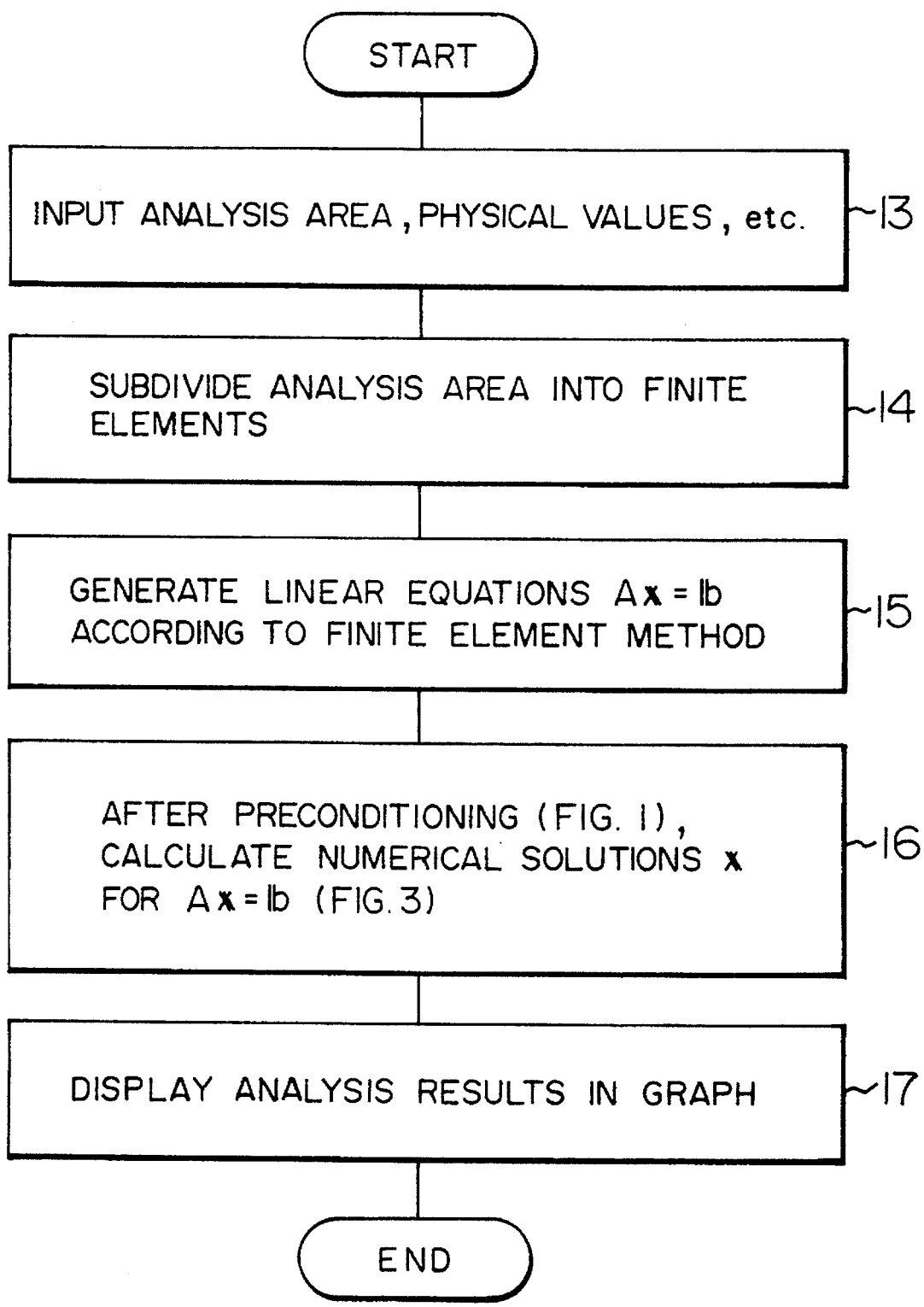
FIG. 4 is a flowchart showing the procedure of a numerical simulation in the finite element method.

FIG. 1 shows a specific procedure of generating submatrices, FIG. 2 shows a concrete method of a step 5 (FIG. 1) of the subdivision of a matrix, and FIG. 3 specifically shows an example of a step 16 (FIG. 4) of calculating numerical solutions of simultaneous linear equations.

In a step 1 of FIG. 1, a coefficient matrix A of the linear equations Ax=b generated in accordance with the finite element method and a right-side vector b thereof are written in a storage. For the coefficient matrix A, a diagonal matrix D and a nondiagonal matrix A are separatedly memorized. Moreover, for the nondiagonal matrix A, only the nonzero elements are to be stored. Consequently, for the nonzero elements of each row, column number index values are stored pairwise in a column number table L. In FIG. 1, the dimensionality or order of the matrix is indicated as N and the maximum number of nonzero elements per row excepting the diagonal element is denoted as ND. In a step 2, there are computed scaling values respectively for scaling the coefficient matrix and the right-side vector b. Assume that each of the diagonal elements D(i), i=1, . . . , N is positive. In a case where 1/D(i), I=1, . . . , N is used in the scaling, when the condition of the diagonal element superiority (D(i)<<U(i)) is remarkably deteriorated, the convergence of solution is impossible. To overcome this difficulty, there is adopted a method in which a scaling value W(i) for each row is calculated according to the sum $\mu_i$ (i=1, . . . , N) of absolute values of nondiagonal elements of the row and the absolute value of the diagonal element D(i) (i=1, . . . , N). In general, a parameter α for the convergence of solution need only be set to a fixed value of about 4.0. However, there may take place a case where the convergence cannot be realized under the conditions above. To cope with such a disadvantageous situation, the system is so configured to be capable of changing the value of α. In a step 3, the scaling is accomplished on the coefficient matrix and the right-side vector. Namely, the value wi (i=1, . . . , N) obtained in the step 2 is multiplied by the pertinent elements thereof. In a step 4, the elements of the coefficient matrix are sorted according to the value of i. The sorting is achieved in a descending order thereof in this case. The scaling and sorting steps may be reversed. In a step 5, using the sorted elements, m submatrices E1, . . . , Em (m is determined according to the value of ND; m≦ND) are produced. The operation above will be described in more detail later with reference to FIG. 2. In a step 6, a sequence of products $w_1$ to $w_m$ are generated from the series of submatrices E1, . . . , Em. The steps above are implemented by means which executes the calculations and processing above while referencing the data written in a storage.

FIG. 2 shows a specific method of subdividing the matrix including nondiagonal nonzero elements created from the nondiagonal nonzero element matrix A into m submatrices. A reference numeral 7 denotes a method of subdivision when the number of maximum nonzero elements per row takes a large value. Since the matrices are sorted according to the value of j as $|\tilde{A}(i,j)| \leq |\tilde{A}(i,j+1)|$, (i=1, . . . , n; j=1, . . , ND−1), the subdivision is conducted such that the resultant submatrix includes an element of the row when the value of j is small, whereas the resultant submatrix includes a larger number of elements as the value of j becomes to be greater. A reference numeral 8 designates a method of subdivision when the number of maximum nonzero elements per row takes a small value.

In this connection, although FIG. 2 shows an example of subdivision. In general, the grouping of submatrices need only conducted such that value of the element of $|\tilde{A}(i,j)|$ or a total of some of the elements thereof takes substantially an identical value, which therefore can be processed by the computer.

FIG. 3 shows a calculation procedure in which a vector as a solution of simultaneous linear equations A·x=b (x and b stands for vectors) is obtained through iterative calculations by use of the Bi-CGSTAB with preconditioning (1990, similar to the solution of Van der Vorst) after the steps of FIG. 1.

In a step 10, the data items are prepared for the iterative calculations. A vector x is an initial vector. If the elements thereof is not determined, zeros need only be set to the respective elements. A vector r is a residual vector. Moreover, (r, r) indicates an inner product. This representation applies to the following description. In a step 11, the iterative calculations are controlled. In a step 12, the iterative calculations are executed according to the CGPM with preconditioning. The solutions are obtained as vector x. In the formulae, A indicates a matrix and vectors p, q, r, $r_0$, e, and v denote vectors of order N. The other symbols designate scalars. A step 12 is a known technology and hence will not be described. The steps above are achieved by means which executes the calculations and processing by referencing the data memorized in the storage.

FIG. 4 shows a procedure of a numerical simulation according to the finite element method. For simplification, there is shown an example of a linear stationary analysis. In a step 13, data items are prepared for the analysis. In a step 14, an area for the finite element approximation is partitioned into subareas. In a step 15, simultaneous linear equations are generated according to the finite element method. In a step 16, numerical solutions are computed for the linear equations. In this step, the solution of conjugate gradient series with preconditions (FIG. 3) is employed for the computation. Data items resultant from the analysis are desirably presented in a graph (step 17).

Figure 5:
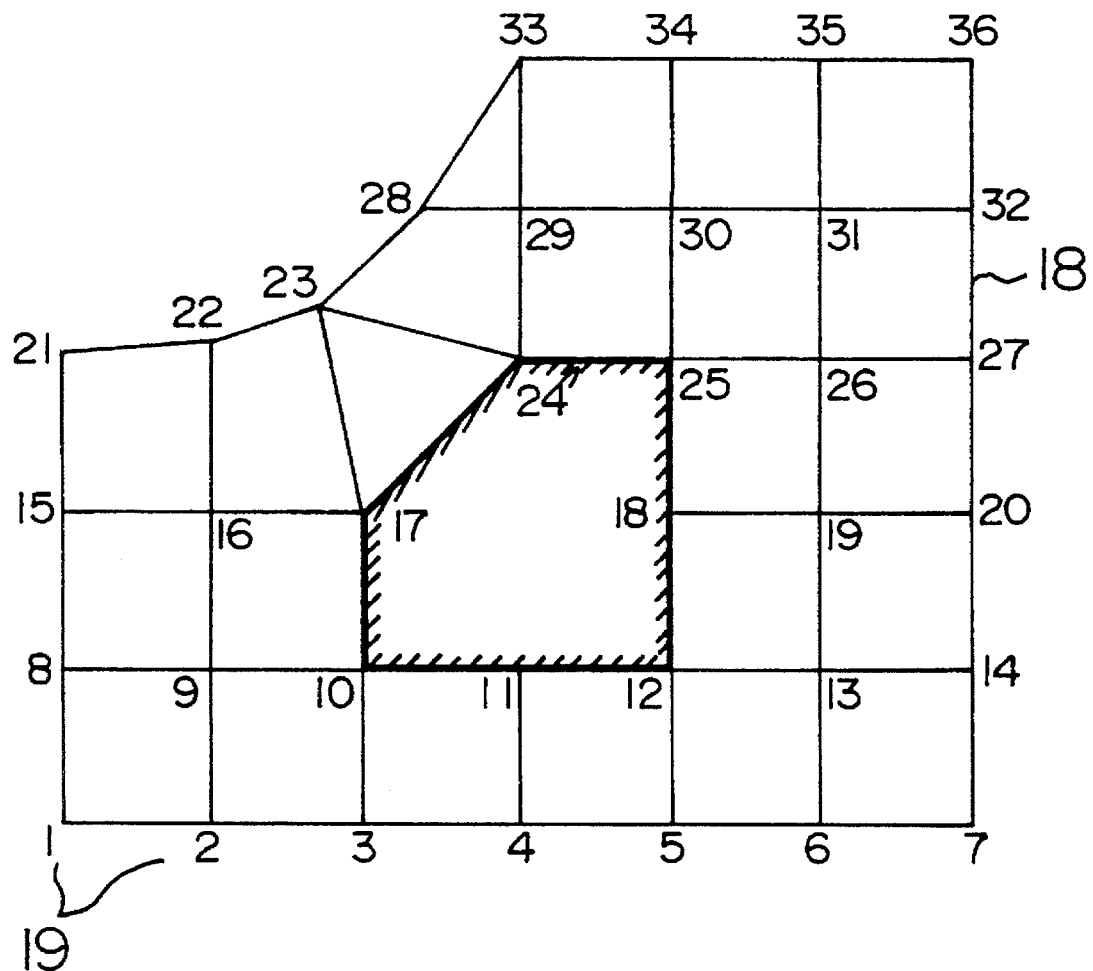
FIG. 5 is a schematic diagram showing a finite element subdivision.

FIG. 5 shows an example of the finite element division. A reference numeral 18 denotes the division of the area into four-node four-edge elements and partially into three-node three-edge elements. A reference numeral 19 designates a node number of each element obtained by the division.

Figure 6:
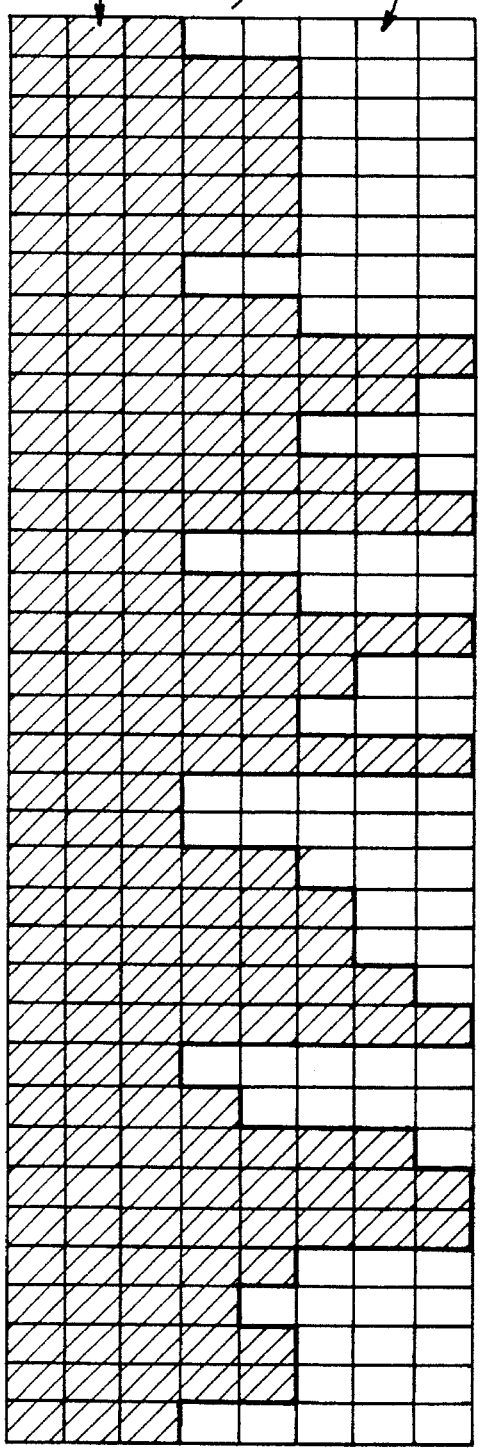
FIG. 6 is a diagram showing a method of storing a coefficient matrix of simultaneous linear equations produced as a result of the subdivision shown in FIG. 5.

FIG. 6 shows an example of a method of storing nondiagonal nonzero elements of the coefficient matrix of simultaneous linear equations generated according to the finite element division of FIG. 5. A reference numeral 20 indicates a column number table L(N,ND) of nonzero elements. A numeral 21 stands for a nonzero element matrix $\tilde{A}$(N,ND). For j=l(i,k), A(i,j) indicates an element $a_{i,j}$ of the dense matrix. A numeral 22 is a column number index. When this entry is open or empty, it is indicated that the associated nonzero element is missing. A numeral 23 denotes a nonzero element of the matrix. A numeral 24 designates an element which has a storage area and which has a value of zero. Based on the nonzero element matrix $\tilde{A}$(N,ND) of this type, there are created submatrices E1, E2, . . . , Em shown in FIG. 1.

In this embodiment, the preconditioning is achieved not through the incomplete LU factorization but by use of a matrix including products resultant from multiplications between (I–Ei), i=1, . . . , m for the following reason. Namely, when the incomplete LU factorization is employed, the degree of parallelization or parallel processing becomes to be remarkably greater than the order N of the linear system. As contrast thereto, the parallel processing degree is equal to the order N in any case according to this method.

There may be adopted another method in which the nondiagonal nonzero elements are sorted in a descending order of absolute values thereof to be grouped into m submatrices E1, . . . , Em. Differences between a unit matrix and the respective submatrices are created to form a sequential product as (I–Em) . . . (I–E2)(I–E1). Using the solution of conjugate gradient series and the product, there can be developed a characteristic of convergence of solution identical to or better than that obtained when the incomplete LU factorization is utilized in the preconditioning.

Moreover, in the scaling of the coefficient matrix and the right-side vector, when the sum of absolute values of nondiagonal elements of each row is used in addition to the diagonal matrix, the convergence of of solution of conjugate gradient series can be stabilized. Particularly, it is possible to improve the characteristic of convergence, namely, a solution which cannot be converged when the diagonal element superiority is greatly deteriorated in the coefficient matrix can be lead to convergence.

Furthermore, the preconditioning matrix and the coefficient matrix are scaled so that the elements thereof respectively have identical values. This consequently reduces the capacity of the main memory; moreover, even a workstation can handle a matrix of a large order or dimensionality.

Embodiment 2

Figure 8:
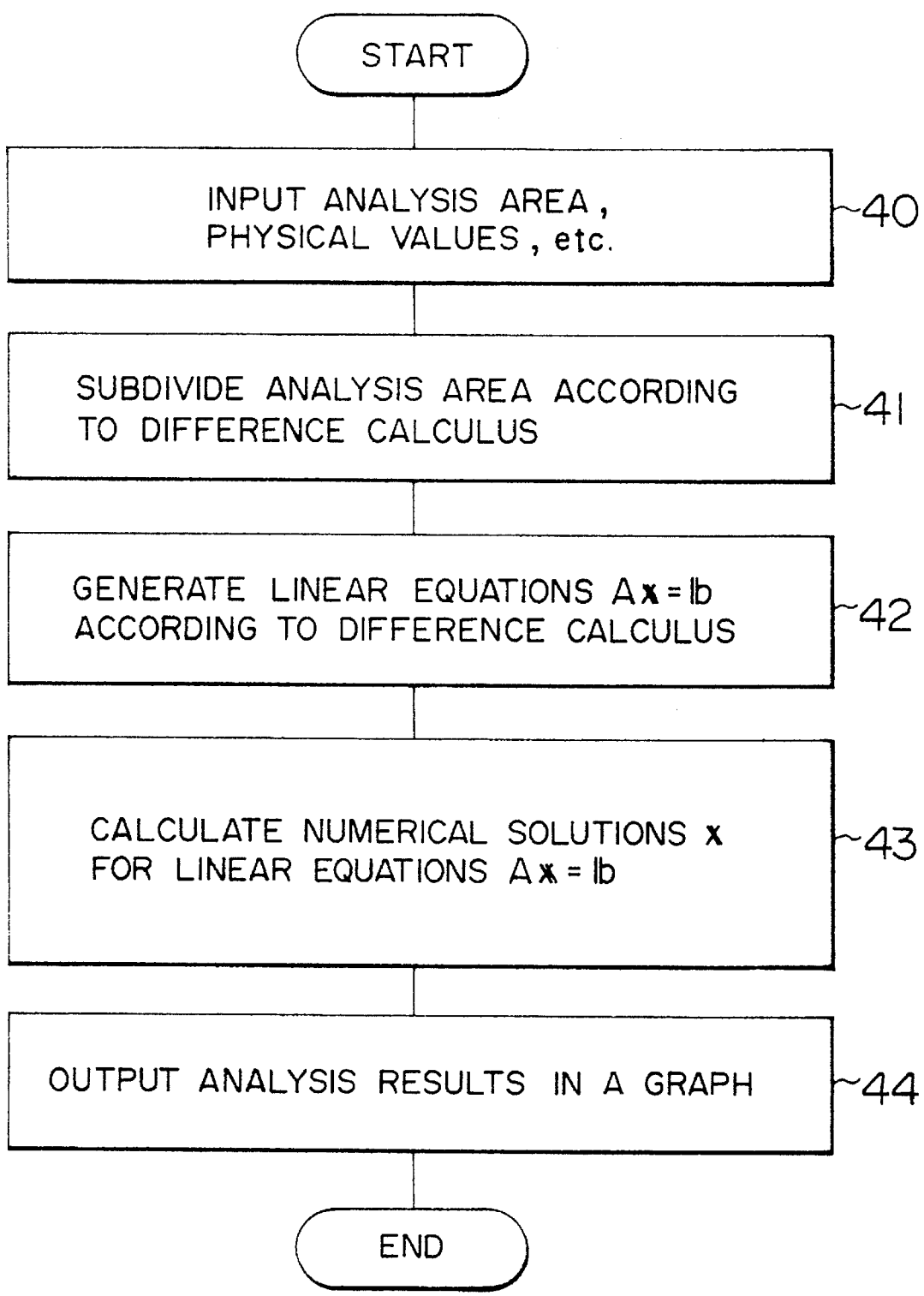
FIG. 8 is a flowchart showing the procedure of a numerical simulation according to a difference calculus.
Figure 9:
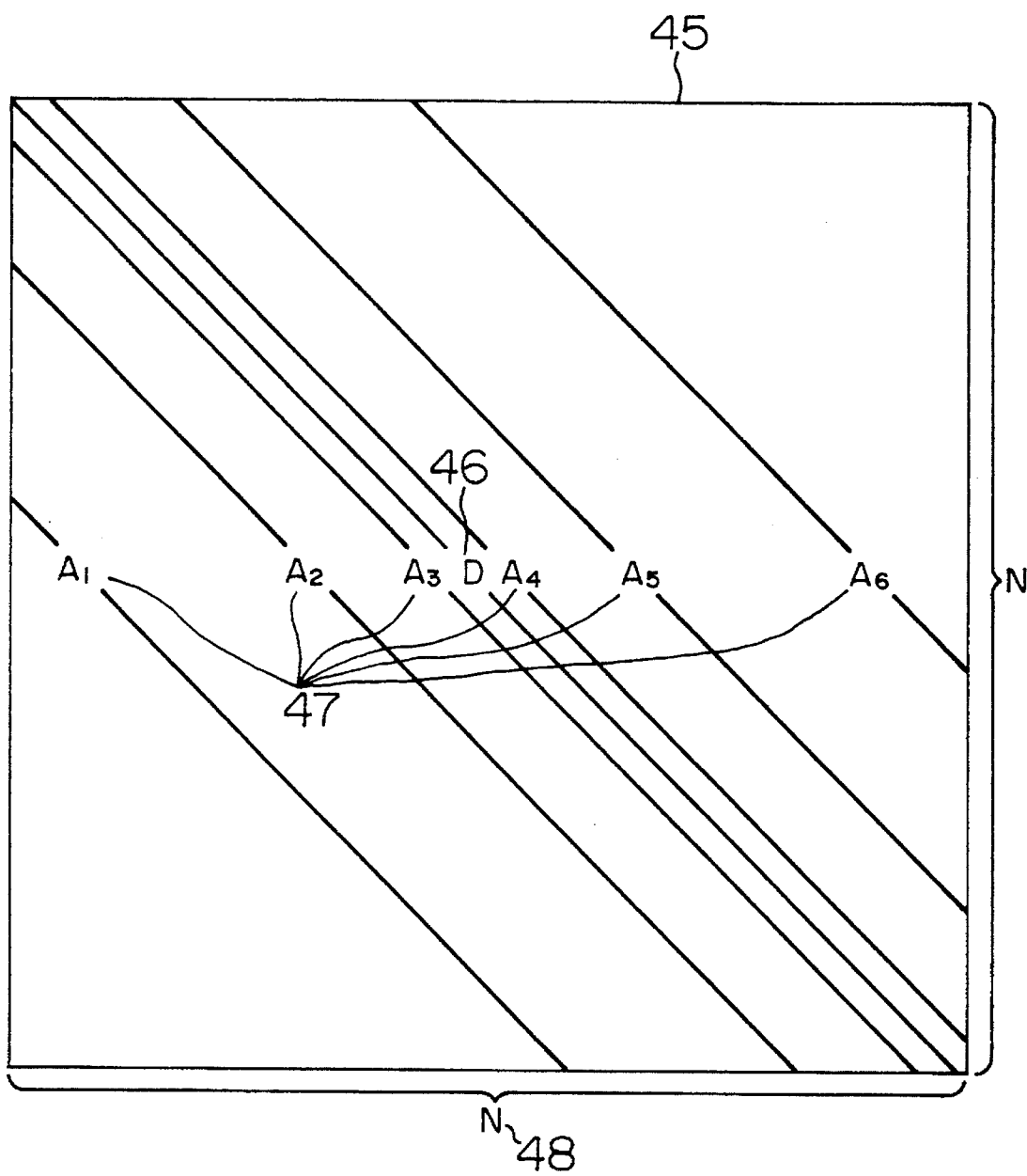
FIG. 9 is a graph showing the structure of nonzero band matrices according to a three-dimensional seven-point difference calculus.

FIG. 7 shows a procedure of preconditioning for use in the calculation of conjugate gradient series in the second embodiment, FIG. 8 shows a procedure of a numerical simulation according to a difference calculus, and FIG. 9 shows the configuration of a nonzero band matrix in the three-dimensional seven-point difference calculus.

FIG. 7 specifically shows the procedure of generating submatrices of FIG. 1, whereas FIG. 3 shows a concrete example of a step 8 (FIG. 8) of calculating numerical solutions of linear equations.

In a step 31 of FIG. 7, a coefficient matrix of the simultaneous linear equations generated according to the difference calculus and the right-side vector thereof are memorized in a storage. For the coefficient matrix A, there are separatedly stored a diagonal matrix D and a nondiagonal matrix $\tilde{A}$. In this example, the discretization is achieved according to the three-dimensional seven-point difference calculus. When the two-dimensional five-point difference calculus is employed, the band matrix including nondiagonal nonzero elements is represented as $\tilde{A}(N,4)$. When there exists a periodic boundary condition, the number of submatrices for the nondiagonal nonzero matrix is increased by two or four. The order of the linear system is N. In a step 32, there are calculated values for scaling the coefficient matrix and the right-side vector. Assume that each of the diagonal elements $D(i)$, i=1, . . . , N is positive. In the conventional case where $1/D(i)$, i=1, . . . , N is used for the scaling, when the diagonal element superiority is remarkably deteriorated, there cannot be attained the convergence of solution. To overcome this difficulty, there is adopted the following method. The computation is achieved, for each row, according to the sum $\mu_i$ (i=1, . . . , N) of absolute values of nondiagonal elements and the absolute value of the associated diagonal element $D(i)$ (i=1, . . . , N). The parameter $\alpha$ need only be set to about 4.0 in general. However, there may occur a case where the converged solution cannot be obtained. To cope with such a disadvantageous situation, the system is so constructed to be capable of varying the value of $\alpha$. In a step 33, the coefficient matrix and the right-side vector are scaled, namely, the values of $w_i$ obtained in the step 32 are multiplied by the associated elements thereof. In a step 34, the nondiagonal elements of the matrix are grouped into m submatrices A1, A2, . . . , Am. In this case using the three-dimensional seven-point difference calculus, the matrix is split into six submatrices A1, A2, . . . , A6. In a step 35, a preconditioning matrix M is produced from the submatrices A1, A2, . . . , A6. The respective steps above can be implemented by means which executes the calculations and processing above by referencing the data written in a storage.

The procedure of computing the conjugate gradient series with preconditioning is as described in conjunction with the flowchart of FIG. 3. The specific procedure of the steps of the flowchart of FIG. 1, namely, the steps of generating submatrices from the matrix A inputted thereto has been described according to the flowchart of FIG. 7.

FIG. 8 shows a procedure of a numerical simulation in accordance with a calculus of finite differences; more specifically, an example of a linear stationary analysis for simplification of description. In a step 40, there is achieved a preparative operation for the analysis. In a step 41, an area for the difference approximation or discretization is subdivided into partitions. In a step 42, simultaneous linear equations are created in accordance with the difference calculus. In a step 43, numerical solutions are computed for the linear equations. In this step, the solution of conjugate gradient series with preconditioning is employed for the calculation.

FIG. 9 shows the structure of nonzero band matrices developed in the three-dimensional seven-point difference calculus. In a portion 45, there are shown positional relationships between nonzero band matrices in the configuration. Reference numerals 46 and 47 respectively denote positions of the diagonal matrix D and six nondiagonal band matrices, respectively. A reference numeral 48 designates that the matrix is of an order N.

In this embodiment, in order to more suitably apply the calculation to the parallel vector computer and the superparallel computer, the incomplete LU factorization is not employed, namely, there is used a matrix including products resultant from multiplications between (I–Ai), i=1, 2, . . . , m. When the incomplete LU factorization is utilized, the degree of parallelization is remarkably increased as compared with the order N of the linear system. In contrast thereto, according to this method, the parallelization degree is kept to be identical to the order N. Moreover, the provision of the products resultant from multiplications between (I–Ai), i=1, 2, . . . , m improves the characteristic of convergence of solution of conjugate gradient series when compared with the case where $E=A_1+A_2+ \ldots +Am$ is assumed to establish $I-E+E^2-E^3+E^4 \ldots$ . This leads to a convergence speed substantially equal to that developed when the incomplete LU factorization is used.

Furthermore, in the scaling of the coefficient matrix and the right-side vector, not only the diagonal matrix but also the sum of absolute values of nondiagonal elements of each row is used for the calculation, thereby stabilizing the convergence of solution of the conjugate gradient series. Particularly, in a case where the diagonal element superiority is greatly deteriorated and hence there cannot be conventionally obtained any converged solution, it is possible to converge the solution.

Embodiment 3

Figure 11:
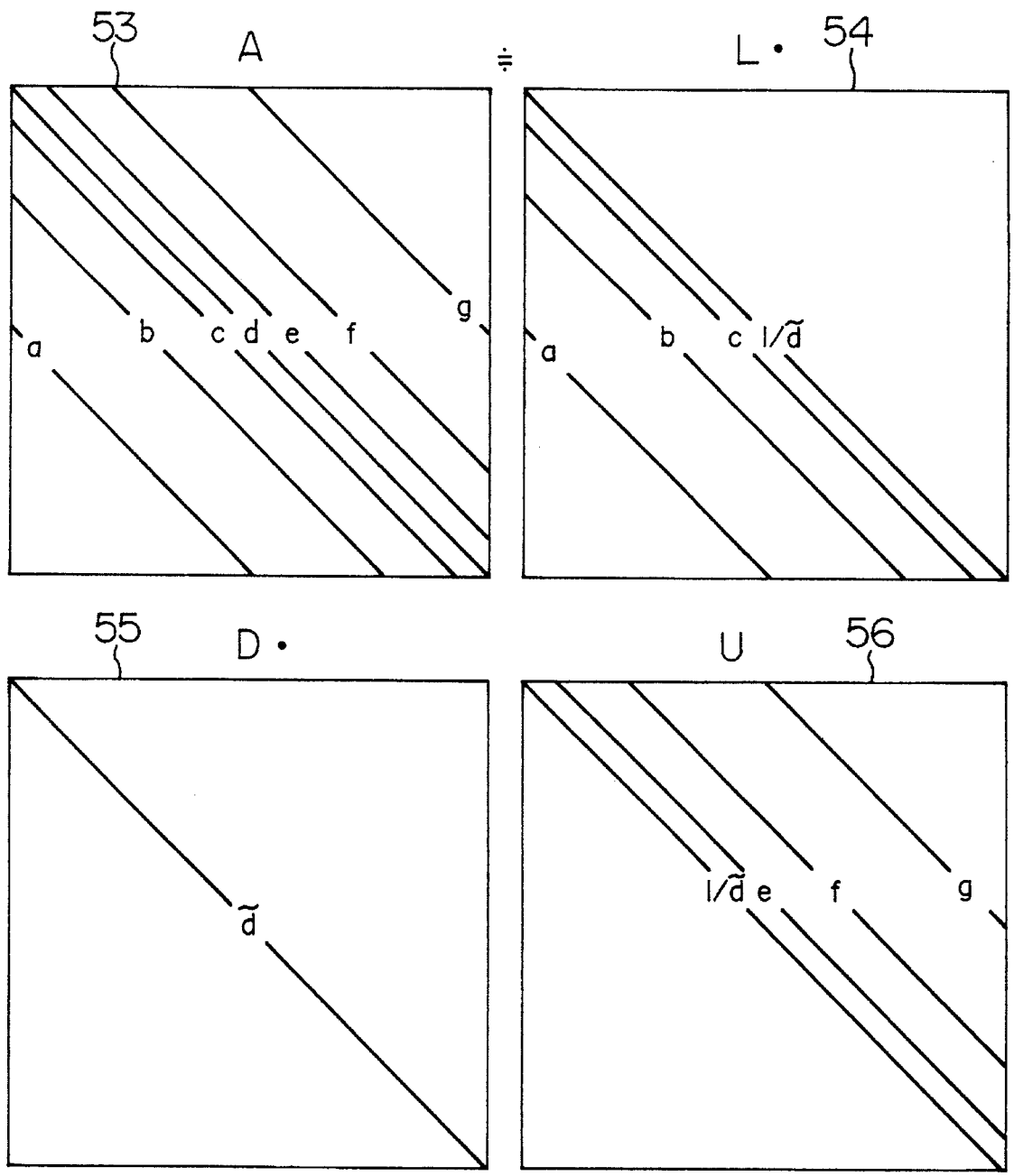
FIG. 11 is a diagram of graphs showing configurations of a coefficient matrix and matrices obtained through an incomplete LU factorization.
Figure 13:
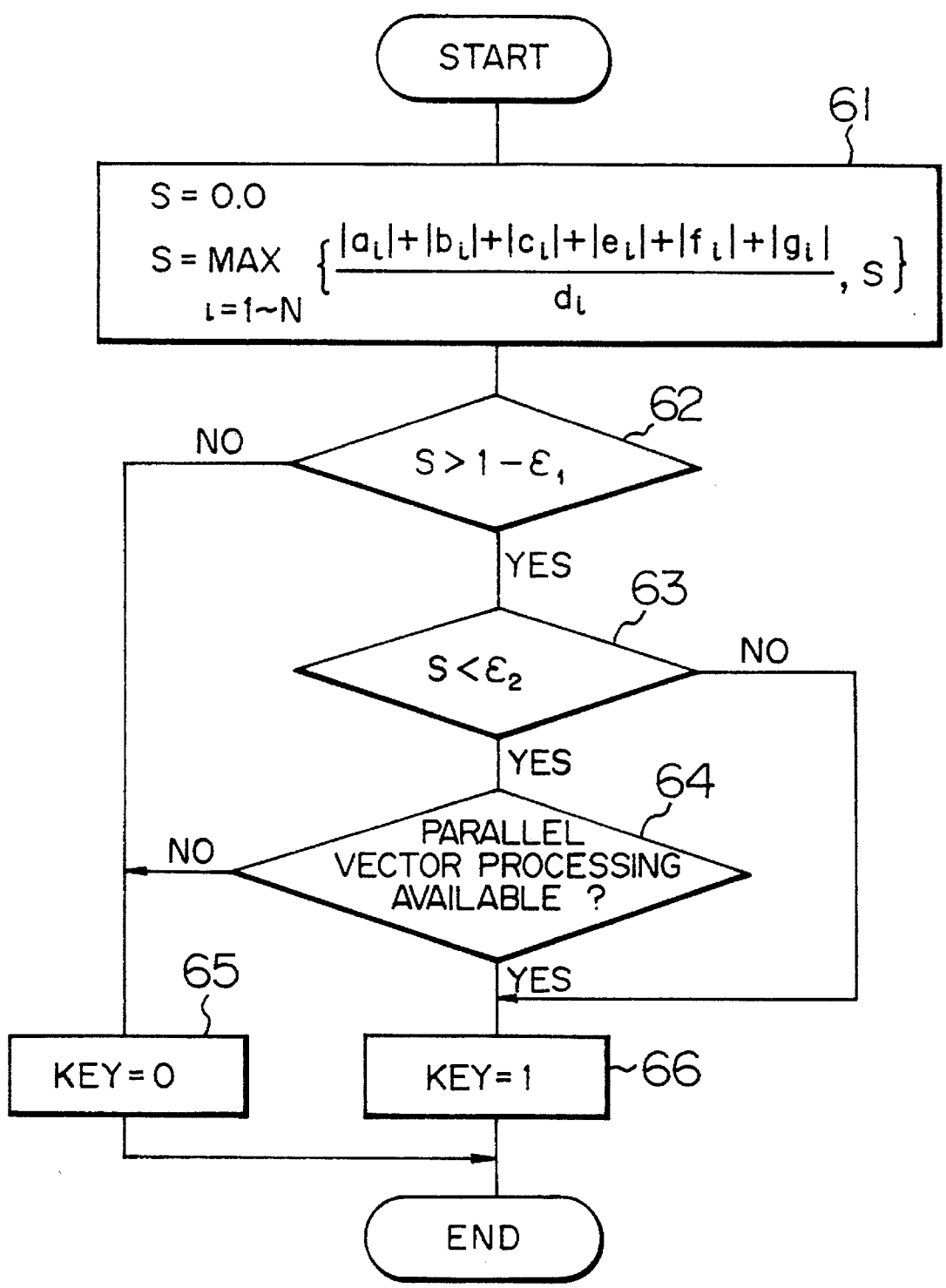
FIG. 13 is a flowchart showing the operation of selecting a preconditioning method.

FIG. 10 shows a procedure of creating matrices, which are generated according to the incomplete LU factorization, for preconditioning in the calculation of conjugate gradient series according to the third embodiment. FIG. 11 shows the construction of a coefficient matrix in the three-dimensional difference calculus and matrices obtained through the incomplete LU factorization. FIG. 12 is a flowchart showing a procedure of calculating conjugate gradient series with preconditioning. FIG. 13 is a flowchart showing the operation of selecting a preconditioning procedure. FIG. 14 is a flowchart showing a procedure of calculating conjugate gradient series with another preconditioning.

FIG. 10 shows a specific example of the procedure of a step 57 (FIG. 12) of producing preconditioning matrices. In the processing of FIG. 13, a preconditioning method is selected and then the result is indicated by a key value. In the calculation procedure of FIG. 14, conjugate gradient series are computed according to the preconditioning method denoted by the key value. In a step 43 (FIG. 8) of calculating numerical values for the linear equations, the calculation method of FIG. 12 or 14 is applied when the computer is a scalar computer or a parallel vector computer, respectively.

In a step 51 of FIG. 10, there is shown an example of a preparative operation for conducting an incomplete LU factorization on the coefficient matrix A. Namely, the sum $\mu i$ of absolute values of nondiagonal elements is computed for each row. There is also calculated a value wi to be assumed as a diagonal element in the incomplete LU factorization. In the formulae, N stands for the dimensionality of the matrix and the symbols other than $\mu i$ and wi are associated with those shown in FIG. 11. Symbols $a_i$, $b_i$, $c_i$, $e_i$, $f_i$, and $g_i$ denotes nondiagonal elements. The value of di is set to be greater than zero (di>0). In a step 52, there is conducted an incomplete LU factorization corrected according to the correction proposed by Gustaffson. In this computation, $\tilde{d}_i=1/\{wi- \ldots \}$ is employed in place of the conventional formula $\tilde{d}_i=1/\{di- \ldots \}$. Resultantly, even when the coefficient matrix is ill conditioned (for a diagonal element, the sum of absolute values of associated nondiagonal is greater than the absolute value of the diagonal element), the convergence of solution is stabilized. Moreover, regardless of the ill-conditioned matrix, the value of the correction coefficient $\alpha$ can be fixed to about 0.95. In addition, to increase the convergence speed, the value of $\alpha$ need only be increased as compared with the dimensionality or order N, where $\alpha$ is less than one. Furthermore, $a_i$ and $g_i$, $b_i$ and $f_i$, and $c_i$ and $e_i$ are arranged at positions apart from the diagonal positions by m, one, and one, respectively. When a vector computer is used for the computation, the calculation of the step 52 need not be achieved in the order of i=1, 2, 3, ..., N. It is only necessary to order the items in a direction according to the hyper-plane method. This technology has already been broadly known.

A reference numeral 53 of FIG. 11 denotes the configuration indicating positions of nonzero elements of the original coefficient matrix A. In this graph, a letter d stands for a diagonal matrix, letters a, b, c, e, f, and g designate non diagonal matrices, and letters $a_i$, $b_i$, $c_i$, $d_i$, $e_i$, $f_i$, and $g_i$ indicate elements of row i in the respective matrices. A graph 54 shows positional configuration of nonzero elements of the lower triangular matrix L attained from the incomplete LU factorization, a graph 55 presents the positional structure of diagonal matrix D, and a graph 56 indicates a positional constitution of nonzero elements of the upper triangular matrix U. In these graphs, each of the symbols a, b, etc. indicate a matrix of the same value as the associated matrix shown in the graph 53 or 54. Only the value of $\tilde{d}$ is additionally calculated.

FIG. 12 shows a procedure of iterative calculations for solutions x of linear equations according to the Bi-CGSTAB method with preconditioning (1990). In a step 57, an incomplete LU factorization is achieved on the inputted matrix A to produce a matrix LDU. The concrete procedure of this step is shown in FIG. 10. In a step 58, a preparative operation is achieved for the iterative calculations. The vector x is an initial vector. When the elements thereof are unknown, zeros need only be set thereto. The vector is a residual vector, whereas (vector r, vector r) denotes an inner product of the vectors, resulting in a scaler value. In a step 59, the iterative operations are controlled. In a step 60, the iterative operations are executed according to the GCPM with incomplete LU factorization. Solutions are attained as the vector x.

Moreover, $q=[LCD]^{-1}\cdot W=[LDC]^{-1} AP$ does not indicate to multiply an inverse matrix of the LDU matrix by the vector w. Namely, the known forward and back substitutions are used to compute the vector 9 from the vector w. Letters A, L, D, and U denote matrices having an order N. Vectors b, x, p, q, r, $r_0$, e, and v stand for vectors of order N. Other symbols indicates scalars.

FIG. 13 is a flowchart showing the operation of selecting a preconditioning method in which submatrices are generated for KEY=0 and the incomplete LU factorization (LDU) is employed as the preconditioning for KEY=1. In a step 61, S is set to the maximum value of the ratio between the value of a diagonal element di and the sum of absolute values of nondiagonal elements associated therewith. If S takes a small value, the property of the matrix is satisfactory; otherwise, the matrix is ill conditioned. In a decision step 62, when the coefficient matrix A is completely a diagonal element superior matrix in the non-stationary computation or the like, namely, for $S \leq 1-\epsilon_1$, it is decided to set 0 to KEY (KEY=0). In general, $\epsilon_1$ is set to about 0.1. In a step 63, when the diagonal element superiority of the coefficient matrix A is remarkably deteriorated, namely, for $S \geq \epsilon_2$, it is decided to set one to KEY (KEY=1). In general, $\epsilon_2$ is set to about two. In a step 64, it is judged, when the coefficient matrix A is found to be not particularly satisfactory or unsatisfactory, to determine whether or not a plurality of vector processors can be adopted for the computation. If this is the case, KEY is set to 0. If only one vector processor is available, KEY is set to one. For KEY=0, there is selected a preconditioning method suitable for the plural vector processors. Namely, the vector processors develops a highly efficient operation.

FIG. 14 is a flowchart showing the procedure of selecting one of the preconditioning methods to conduct iterative calculations, thereby obtaining vector x as solutions of the linear equations according to the CGPM with preconditioning. In a step 67, the value of KEY is established. In a step 68, a preconditioning is executed depending on the value (0 or 1) of KEY. For KEY=0, the preprocessing matrix M is generated according to the procedure of FIG. 7. In a step 69, the residual vector r is established also depending on the value of KEY. In a step 70, a preparative operation is conducted for the iterative calculations. In a step 71, the iterative calculations are controlled. Through steps 72 to 75, the iterative calculations are achieved in accordance with the CGPM with preconditioning so as to obtain solutions in the form of the vector x. Each of the steps 72 and 74 conducts a computation depending on the value of KEY. The steps 23 and 25 carry out common calculations. Letters A, M, L, D, and U denote matrices of an order N; vectors b, x, p, q, r, $r_0$, e, and v have an order N, and other symbols stand for scalars.

In FIG. 8, there are shown the computation procedure of a numerical simulation in a difference calculus. Numerical solutions of the linear equations are computed in the step 43. For this portion, the procedure of FIG. 12 or 14 is employed in the scalar computer or the parallel vector computer, respectively.

According to the embodiment, using the iterative solution of conjugate gradient series with incomplete LU factorization, there is obtained an advantage of a stable computation of numerical solutions for simultaneous linear equations. Particularly, it is possible to avoid the conventional case in which when the diagonal superiority is greatly deteriorated for the matrix, the converged solution cannot be attained according to the conventional incomplete LU factorization. Moreover, by setting the correction coefficient $\alpha$ of the Gustafsson-type correction is fixed to be about 0.95 regardless of the property of diagonal element superiority of the matrix, the characteristic of convergence can be improved to be three to five times, as compared with the conventional case, for a two-dimensional problem of 100 by 100 subdivision. Furthermore, when the value of $\alpha$ is increased in proportion to the subdivision number used to subdivide the pertinent area ($\alpha<1.0$), the convergence speed can be much more increased.

Additionally, in a super-computer having a plurality of vector processing units, one of the two preconditioning methods can be automatically selected depending on the number of available vector processors and the property of the coefficient matrix (namely, ill or well conditioned) so as to calculate numerical solutions of the simultaneous linear equations at a higher speed.

While particular embodiments of the invention have been shown and described, it will be obvious to those skilled in the art that various changes and modifications may be made without departing from the present invention in its broader aspects.

I claim:

1. An apparatus for generating submatrices for a preconditioning of a coefficient matrix of simultaneous linear equations, said apparatus comprising:

storing means for storing therein data of a coefficient matrix of simultaneous linear equations and data of a right-side vector;

indexing means for assigning a column index L to each nondiagonal nonzero element for each row selected from the stored coefficient matrix with a correspondence established therebetween and storing the nonzero elements in the storing means;

means for performing a summation of all absolute values of the stored nonzero elements for each row of the coefficient matrix fetched from the storing means, where an absolute value of the nonzero element is a number with a positive sign derived from changing the sign to positive if negative;

scaling means for scaling the data of the coefficient matrix and the data of the right-side vector fetched from the storing means according to a plurality of diagonal elements on a main diagonal axis of the coefficient matrix and the summation of the absolute values produced by the summation performing means;

sorting means for comparing with each other absolute values of the nonzero elements scaled by said scaling means for each row, thereby sorting the nonzero elements into an ascending or descending order and changing an order of the column index L to keep correspondence thereof; and submatrix generating means for subdividing a matrix consisting of the sorted nonzero elements $\tilde{A}(N,1)$, $\tilde{A}(N,2)$, $\tilde{A}(N,ND)$ wherein N denotes a number of rows of the coefficient matrix and ND denotes a maximum number of nonzero elements per row into submatrices E1, E2, ..., Em, wherein each submatrix is a matrix consisting of the nonzero elements $\tilde{A}(N,j)$ or $\tilde{A}(N,k)+ ... +\tilde{A}(N,l)$ $1\leq j, k, l\leq ND$, and a norm represented by $|A(N,j)|$ or $|A(N,k)|+ ... +|A(N,l)|$ is approximately the same value respectively, where $|A(N,j)|$ represents an absolute value of the $A(N,j)$.

2. An apparatus according to claim 1, further including multiplying means for sequentially achieving matrix multiplications and thereby producing a matrix product $(I-E1)\times(I-E2)\times ... \times(I-Em)$, where I indicates a unit matrix and I-Em means a matrix subtraction.

3. An apparatus according to claim 1, further including means for achieving interactive calculations according to conjugate gradient method and thereby obtaining numerical solutions of the linear equations according to the data of the coefficient matrix of the linear equations and the data of the right-side vector.

4. An apparatus according to claim 1, further including a table having the column indices as elements thereof and storing therein nonzero elements of combinations of a row number N and the maximum number ND of nonzero elements for each row excluding a diagonal element associated with the row, thereby enabling a comparison between nonzero elements.

5. An apparatus according to claim 1, wherein the linear equations are those created in a process of a numerical simulation according to a calculaus of finite differences.

6. An apparatus according to claim 1, wherein the linear equations are those created in a process of a numerical simulation according to a finite element method.

7. An apparatus according to claim 1, further including:

means for achieving an incomplete LU factorization for the coefficient matrix of said linear equations by decomposing the coefficient matrix into a product of a lower triangular matrix L and an upper triangular matrix U in accordance with diagonal elements thereof; and means for determining whether generating the submatrices or achieving the incomplete LU factorization in accordance with a maximum value of a ratio between an absolute value of a diagonal element on a main diagonal axis and a sum of absolute values of the nondiagonal elements for each row.

8. An apparatus for calculating preprocessing submatrices for a coefficient matrix of simultaneous linear equations generated in a process of a numerical simulation according to a finite element method, said apparatus comprising:

storing means for storing therein the coefficient matrix, a right-side vector B, the preprocessing submatrices resultant from calculation, and intermediate results thereof;

means for assigning column number indices to nondiagonal nonzero elements of the coefficient matrix for each row thereof, respectively by reference to contents of the storing means, and scaling the coefficient matrix and the right-side vector according to diagonal elements on a main diagonal axis and sum of the absolute values of nondiagonal elements of the coefficient matrix;

means for sorting the nonzero elements in a predetermined order in accordance with magnitude of each of the absolute values thereof and thereby subdividing the nonzero elements into m submatrices E1, E2, . . . , Em each being a matrix consisting of the nonzero elements, and a norm being approximately the same value respectively; and calculating and processing means for sequentially conducting multiplications between (I–Ei), i=1, 2, . . . , m, where I is a unit matrix.

9. An apparatus for calculating preprocessing submatrices for a coefficient matrix of simultaneous linear equations generated in a process of a numerical simulation according to a calculus of finite differences, said apparatus comprising:

storing means for storing therein the coefficient matrix, a right-side vector B, the preprocessing submatrix resultant from the calculation, and intermediate results thereof;

means for scaling the coefficient matrix and the right-side vector according to a sum of absolute values of nondiagonal elements of the coefficient matrix and a value of a diagonal element related thereto by reference to contents of the storing means; and calculating and processing means for sequentially conducting multiplications between (I–Ai), i=1, 2, . . . , m, where I is a unit matrix and Ai is a nondiagonal band matrix having elements only in band matrices of A1, A2 . . . A6 except diagonal elements on a main diagonal axis.

10. A computer for use with simultaneous linear equations for computing incomplete LU factorization matrix for a coefficient matrix of the linear equations, wherein the whole coefficient matrix is decomposed into a product of a lower triangular matrix L and an upper triangular matrix U, said computer comprising:

means for storing therein the coefficient matrix, a result of the calculation, and intermediate results thereof; and calculating and processing means for achieving an incomplete LU factorization of the coefficient matrix by decomposing into a product of lower and upper triangular matrices by reference to contents of the storing means according to a value determined by both a diagonal element on a main diagonal axis and a sum of absolute values of nondiagonal elements for each row.

11. A computer according to claim 10, wherein the simultaneous linear equations are those created in a process of a numerical simulation in a calculus of finite differences.

12. A computer according to claim 10, wherein whether the calculation to attain a preconditioning matrix or the calculation to obtain the incomplete LU factorization matrix is to be executed is determined in accordance with two parameters including a number of available vector processors and a ratio between a sum of absolute values of nondiagonal elements of the coefficient matrix and a value of a diagonal element related thereto.

13. A method of generating submatrices for a preconditioning of a coefficient matrix of simultaneous linear equations presented by physical variables in a process of analyzing a physical system, said method comprising the steps of:

storing data of a coefficient matrix of simultaneous linear equations, data of a right-side vector, and nondiagonal nonzero elements selected from the stored coefficient matrix with a column index L assigned to each of the nonzero elements for each row;

adding to each other the stored nonzero absolute values of elements for each row of the coefficient matrix;

scaling the data of the coefficient matrix and the data of the right-side vector according to diagonal elements of the coefficient matrix and a sum of the absolute values;

comparing with each other absolute values of the nonzero elements of the coefficient matrix and thereby sorting the nonzero elements into a predetermined order and changing the order of the column index L so as to keep correspondence thereof; and subdividing a matrix consisting of the sorted nonzero elements $\tilde{A}$ (N,1), $\tilde{A}$ (n,2), . . . ,$\tilde{A}$ (N,ND) wherein N denotes the number of rows of the coefficient matrix and ND denotes a maximum number of nonzero elements per row into submatrices E1, E2, . . . , Em, wherein each submatrix consists of the nonzero elements $\tilde{A}$ (N,j) or $\tilde{A}$ (N,k)+ . . . +$\tilde{A}$ (N,l), $1 \leq j$, k, $1 \leq ND$, and a norm represented by $|A(N,j)|$ or $|A(N,k)|+ . . . +|A(N,l)|$ is approximately a same value respectively, where $|\tilde{A}(N,j)|$ means an absolute value of the $\tilde{A}$ (N,j).

14. A method according to claim 13, further including the step of sequentially achieving multiplications for producing a product (I–E1)×(I–E2)× . . . ×(I–Em), where I indicates a unit matrix.

15. A method according to claim 13, further including the step of achieving iterative calculations for obtaining numerical solutions of the linear equations according to the data of the coefficient matrix of the linear equations and the data of the right-side vector.

\* \* \* \* \*